Aug. 10, 1948.   W. J. GREGORY   2,446,649
AUTOMATIC MACHINE FOR MAKING BEADED CUPS
Filed March 26, 1947   11 Sheets-Sheet 1

Fig. 1.

INVENTOR.
Whitney J. Gregory
BY
Chritton, Schroeder, Merriam & Hofgren
Attorneys

Aug. 10, 1948.  W. J. GREGORY  2,446,649
AUTOMATIC MACHINE FOR MAKING BEADED CUPS
Filed March 26, 1947  11 Sheets-Sheet 2

INVENTOR.
Whitney J. Gregory
BY
Chritton, Schroeder, Merriam & Hofgren
Attorneys Aug. 10, 1948.  W. J. GREGORY  2,446,649
AUTOMATIC MACHINE FOR MAKING BEADED CUPS
Filed March 26, 1947  11 Sheets-Sheet 3

INVENTOR.
Whitney J. Gregory
BY
Chritton, Schroeder, Merriam & Hofgren
Attorneys

Aug. 10, 1948.  W. J. GREGORY  2,446,649
AUTOMATIC MACHINE FOR MAKING BEADED CUPS
Filed March 26, 1947  11 Sheets-Sheet 5

INVENTOR.
Whitney J. Gregory
BY
Chritton, Schroeder, Merriam & Hofgren
Attorneys

Aug. 10, 1948.   W. J. GREGORY   2,446,649
AUTOMATIC MACHINE FOR MAKING BEADED CUPS
Filed March 26, 1947   11 Sheets-Sheet 6

Fig. 17

Aug. 10, 1948. W. J. GREGORY 2,446,649
AUTOMATIC MACHINE FOR MAKING BEADED CUPS
Filed March 26, 1947 11 Sheets-Sheet 11

INVENTOR.
Whitney J. Gregory
BY
Chritton, Schroeder, Merriam & Hofgren
Attorneys Patented Aug. 10, 1948

2,446,649

UNITED STATES PATENT OFFICE 2,446,649

AUTOMATIC MACHINE FOR MAKING BEADED CUPS

Whitney J. Gregory, Peoria, Ill.

Application March 26, 1947, Serial No. 737,395

10 Claims. (Cl. 93—47)

This invention relates to an automatic machine for making cup-shaped containers with beaded edges from strip material, and more particularly from thermoplastic material such as cellulose acetate.

The primary object of the invention is to provide a fully automatic machine wherein work material in strip form may be fed into one portion of the machine, and complete cup-shaped beaded containers will be discharged from other portions of the machine.

A further object of the invention is to provide an improved blanking and forming die which will make cup-shaped containers which will have smooth and regular rounded shape and will slide into beading position readily on the beading unit.

Another object of the invention is to provide a simple feeding device which will feed strip material intermittently under a slight tension into the blanking die in timed relation to the operation of the movable parts of the die.

Another object of the invention is to provide a blanking die with an improved cutting edge and another cutter for trimming off the waste margin from a cup after it has been drawn.

A further object of the invention is to provide a circular group of beading units which are operated seriatim in timed relation to the forming die.

Still another object of the invention is to provide improved movable conveying means for transporting the containers from the forming die to the beading units.

Another object of the invention is to provide automatic feeding units for pressing the edge of the cup into the bead-forming groove and oscillating the container while the bead is being formed.

Other objects of the invention will be apparent from the following detailed description of the accompanying drawings, in which—

In the embodiment illustrated, A designates a main frame having a top platform A', on which a blanking and forming die is mounted, and a lower platform $A^2$ on which bead-forming units are mounted; B, a blanking and forming die which is driven from a cam shaft, from a suitable electric motor mounted on the platform A'; C, feeding and tensioning mechanism for advancing a strip of material through the die B; D, electrically heated beading units mounted on the platform $A^2$; E, a rotary turret which is provided with operating cams for the beading units and serves as part of the conveyor mechanism for moving the containers from the forming die to the beading units; and the transmission means includes a sprocket chain F' for driving a shaft with a beveled gear, which in turn drives through a beveled gear and sprocket a chain $F^2$ which through an intermittent feed device operates a sprocket chain $F^3$, the chain $F^3$ also driving a chain $F^4$, which through suitable gearing drives a sprocket chain $F^5$ which continuously rotates the turret E.

The main frame A has its upper and lower platforms secured together in spaced relation by three tubular legs 23 which preferably are provided at their lower ends with casters 24. The upper platform A' has a fixed superstructure 25 having bearings 26 for a drive shaft 27. A worm gear reduction mechanism 28 is provided at one end of the shaft, and has a pulley 29 driven by belt 30 from an electric motor 31 mounted on the platform A'.

Figure 1:
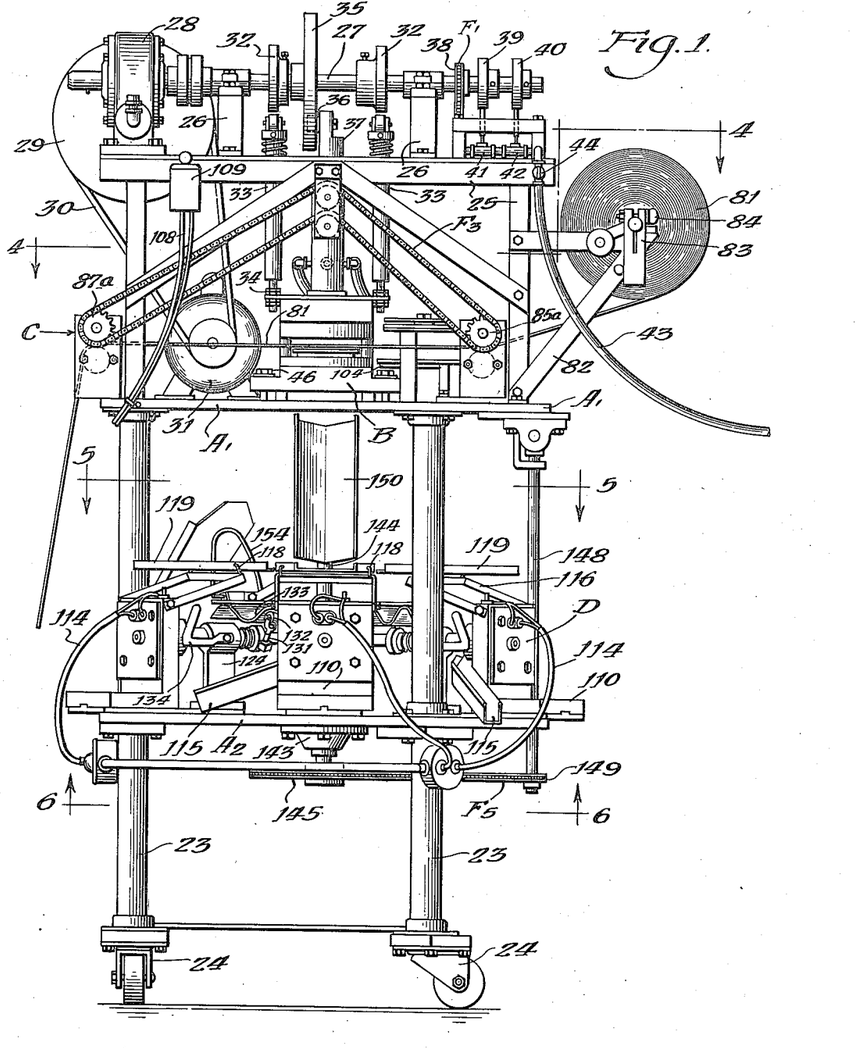
Figure 1 is a front elevational view of a machine embodying the invention.
Figure 2:
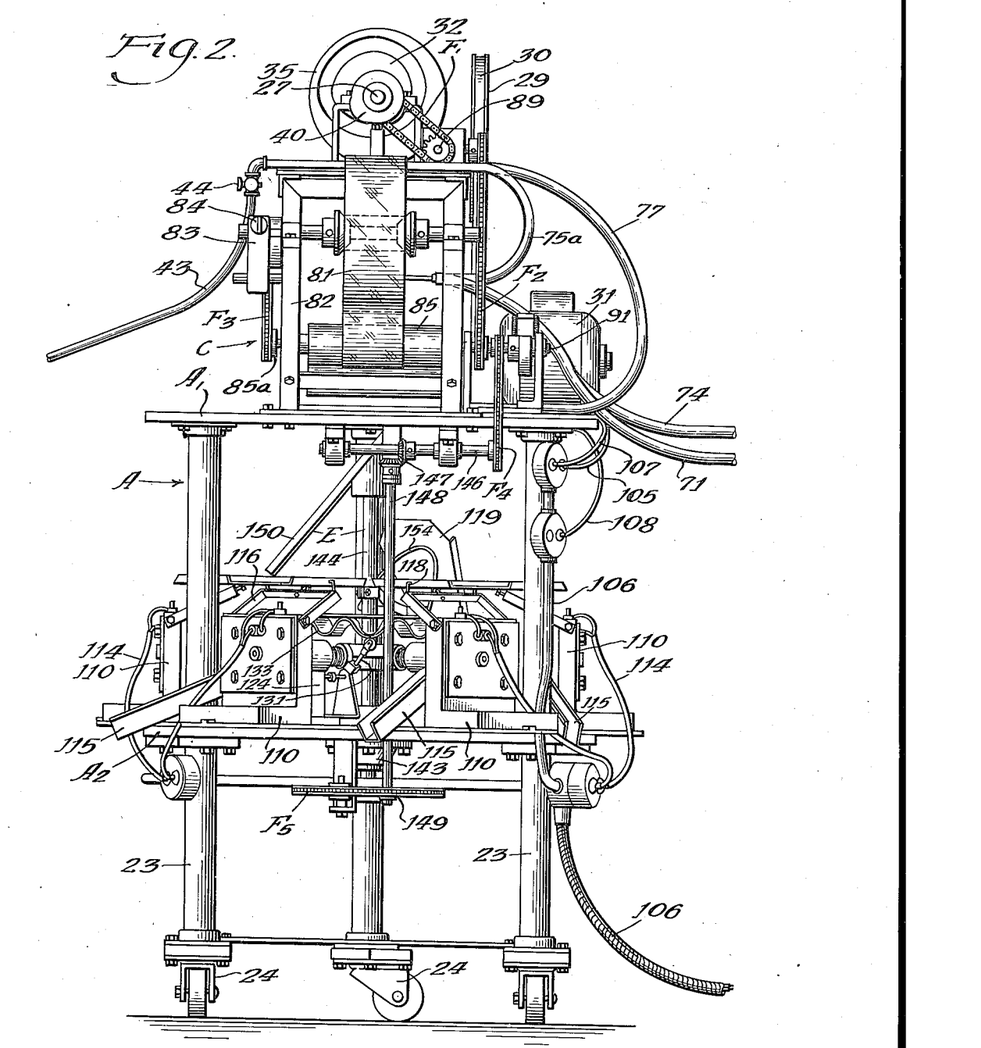
Fig. 2, a side elevational view of the same.
Figure 3:
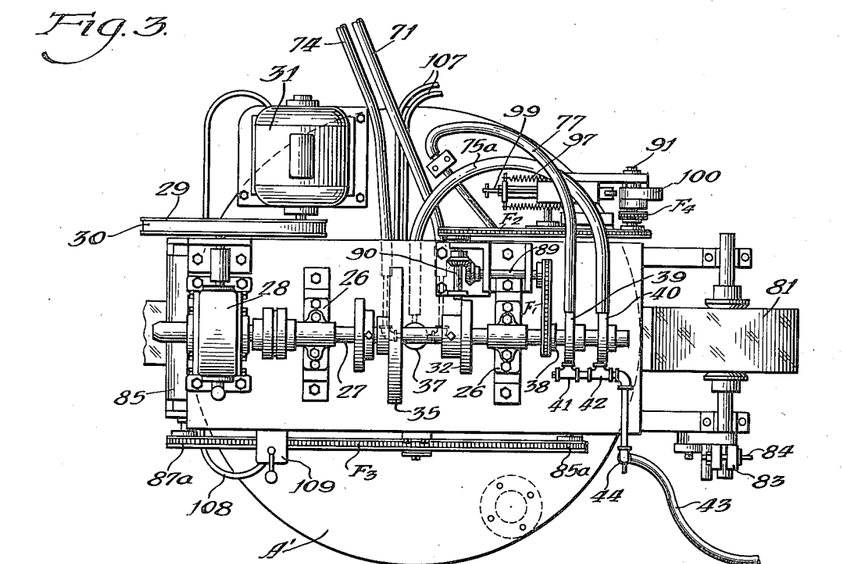
Fig. 3, a top plan view.
Figure 4:
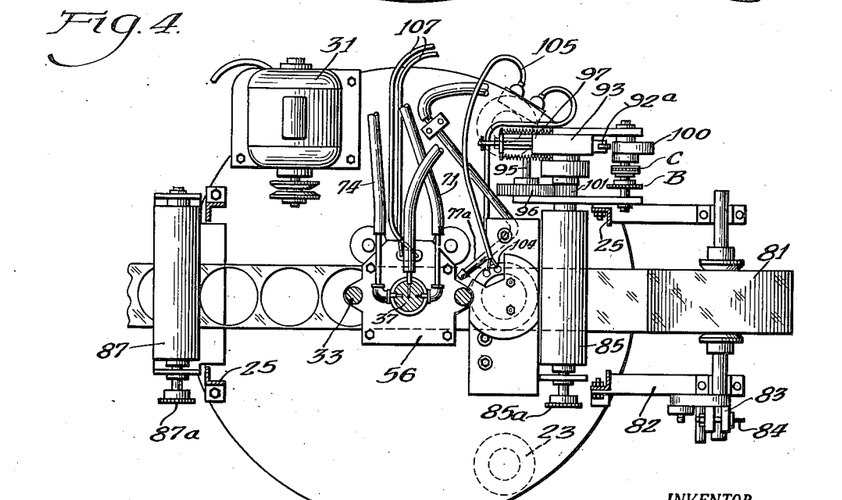
Fig. 4, a plan sectional view, taken as indicated at line 4—4 of Fig. 1.
Figure 5:
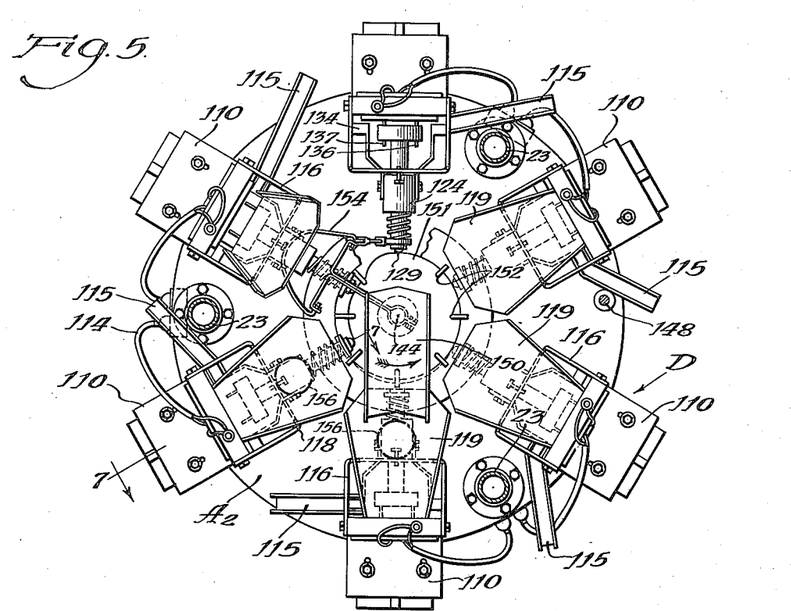
Fig. 5, a top plan sectional view, taken as indicated at line 5—5 of Fig. 1.

The drive shaft 27 is driven continuously by an electric motor and has a pair of cams 32 which periodically depress spring-held push rods 33, which are secured at their lower ends to part of the blanking die B, by means of lock nuts 34. The shaft 27 is also provided with a grooved cam wheel 35, into which extends a roller 36 provided at the upper end of the plunger 37 of the forming die. The drive shaft 27 is further provided with a sprocket wheel 38 which drives the sprocket chain F". A pair of cams 39 and 40 are provided at one end of the shaft 27 and operate through push rods a pair of valves 41 and 42, respectively, in a compressed air line 43. The air line may have a hand-operated cut-off valve 44, as shown in Figs. 1 and 2.

Figures 15, 16:
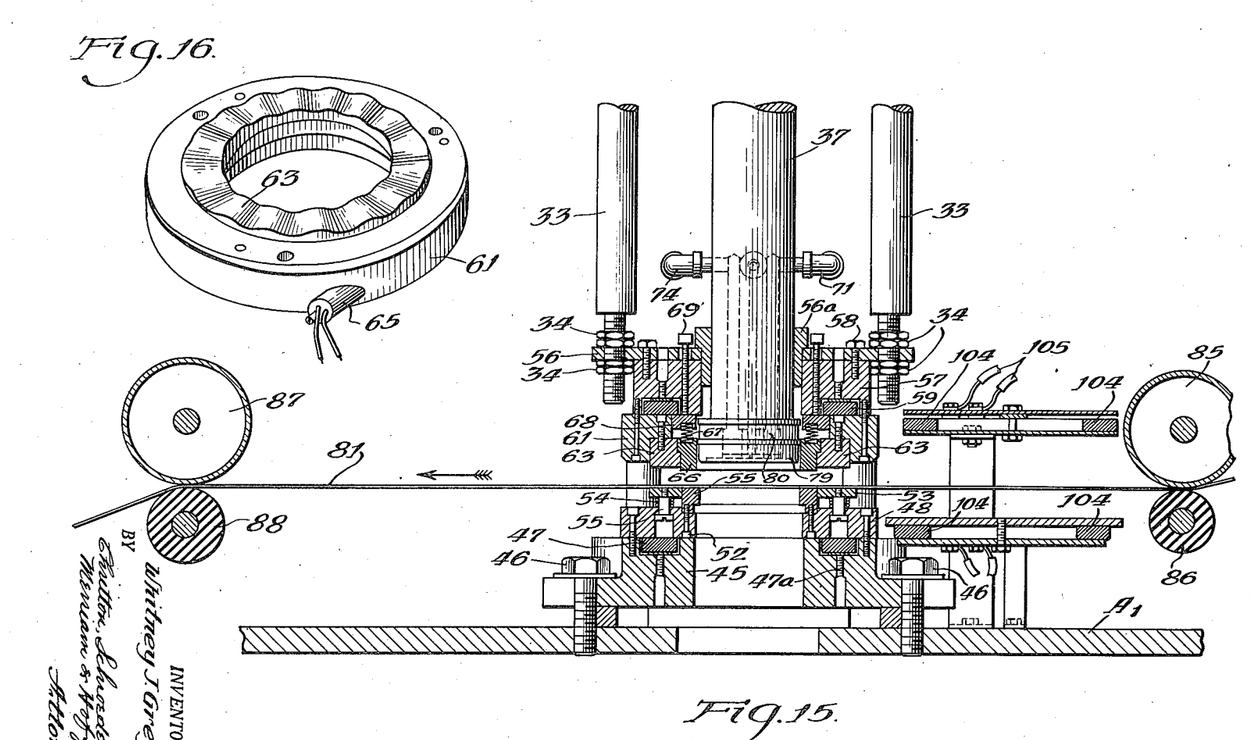
Fig. 15, a fragmentary vertical sectional view of the blanking and forming die mechanism in open position.
Fig. 16, an enlarged perspective view of the outside blanking ring and its holder.
Figure 17:
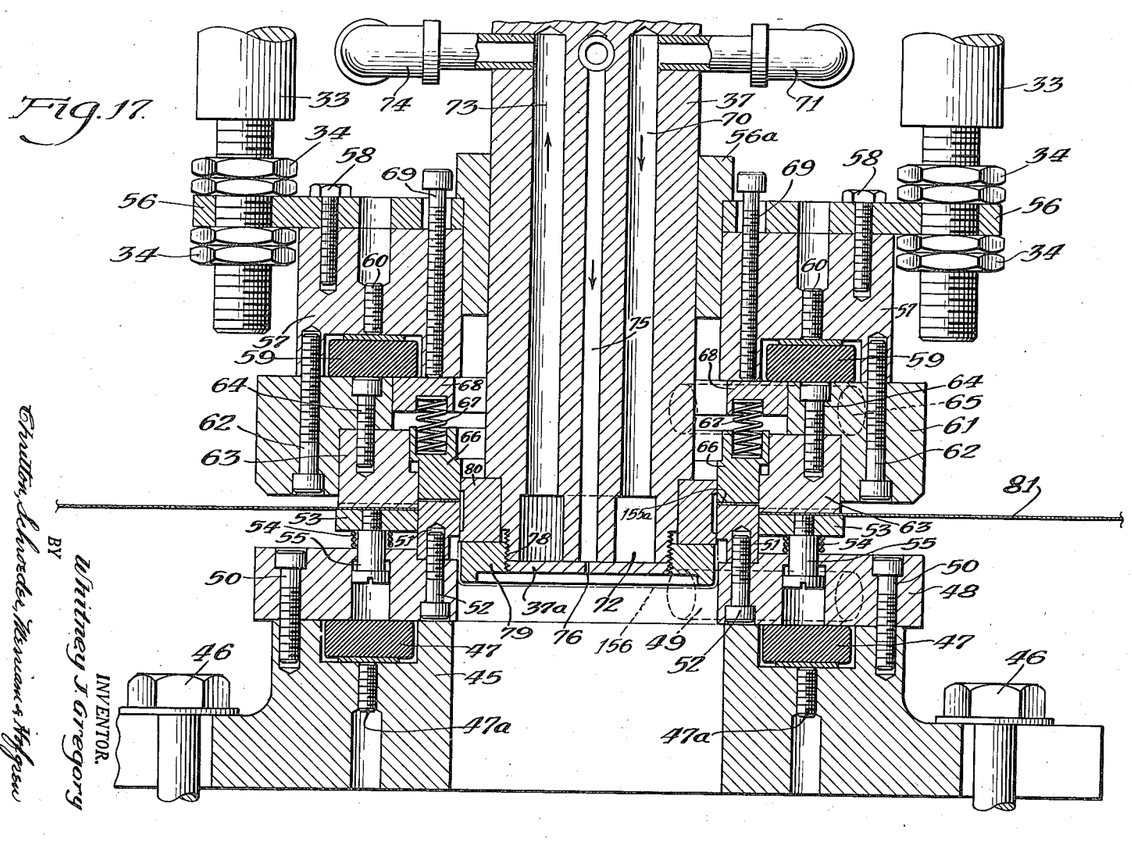
Fig. 17, an enlarged vertical sectional view of the blanking and forming mechanism, showing the die in closed position after forming a cup.
Figure 18:
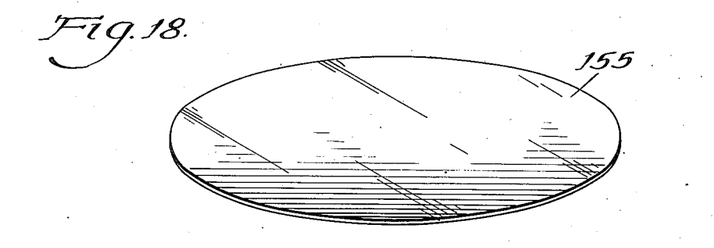
Fig. 18, a perspective view of a circular blank which is cut in the first operation from the strip of work material.

The blanking and forming die B has a base plate 45 which is bolted to the top platform A', as indicated at 46. The base plate has a central opening which communicates with an opening in the panel A', through which the formed containers may drop. An electric heating coil 47 is placed in a groove in the top of the base plate and is pressed snugly against a crown plate 48 by means of headed screws 47a. The heating ring is controlled by a thermostatic switch, indicated by dotted lines 49 in the crown plate, as shown in Fig. 17. The crown plate is gripped to the base plate by means of bolts 50, and a ring-shaped female die 51 is bolted to the crown plate by means of bolts 52. The inner diameter of the female die 51 regulates the outer diameter of the finished container. Surrounding the female die 51 is a ring-shaped stripper plate 53 which is urged upwardly by compression springs 54 surrounding machine screws 55 whose heads are slidably mounted in shouldered sockets in the crown plate 48. The upper portion of the blanking die has a plate 56 which is adjustably mounted on the push rods 33 by the lock nuts 34. The plate 56 is provided with a bushing 56a through which the plunger 37 may slide. An upper crown ring 57 is secured to the plate 56 by means of bolts 58. The lower end of the ring contains a heating coil 59 secured in position by cap screws 60. A holding ring 61, shown in inverted position in Fig. 16, is secured to the upper crown ring 57 by means of bolts 62. A hardened steel outside blanking ring 63 is bolted to the holding ring, as indicated at 64. As best shown in Fig. 16, the blanking ring has an undulated cutting edge which is adapted to shear off the work material by its contact with the outer edge of the ring 51. A thermal switch 65 is imbedded in the holding ring 61, to control the temperature of the upper heating ring 59.

Inside of the shouldered blanking ring is mounted a presser ring 66 which has an outwardly offset shoulder to limit its downward travel with respect to the blanking ring. The presser ring is yieldingly urged downwardly by a plurality of compression springs 67 which bear against a ring 68. The pressure exerted by the springs may be controlled by adjusting screws 69, which make a threaded connection with the upper crown ring 57 and bear against the ring 68.

The plunger 37 has an inlet opening 70 which communicates with a source of cooling water through pipe connections 71. The plunger is provided at its lower end with a ring-shaped open chamber 72, through which water may be circulated and discharged through an opening 73 through pipe connections 74. The plunger is also provided with a central air conduit 75, through which compressed air may be introduced from the air line 75a which is controlled by the valve 42 and the cam 40. A cap 37a is provided at the lower end of the plunger to close the water chamber 72, and is provided with a small orifice 76 for the escape of air. Another air line 77 from the valve 42 conducts air to the nozzle 77a and serves to blow away a waste ring after a forming operation.

The lower end of the plunger is threaded, as indicated at 78, to make threaded connection with the ring shaped forming punch 79. The lower outer edge portions of the plunger are rounded, and serve to shape the container when the plunger travels downwardly through the ring 51. A cutting collar 80 is gripped tightly against the shouldered portion of the lower end of the plunger by means of the forming punch 79, and has sharp outer corner portions which serve to shear off a trim ring from the top of the container as the forming punch advances into the female die. The collar 80 may be inverted, by removing the head 79, in the event that the lower cutting edge becomes dulled.

The operation of the blanking and forming die will be understood by reference to Fig. 15, which shows a strip of work material advancing into the opened die, and Fig. 17, which shows the plunger at the end of its downward stroke. The work material is first gripped between the ring 51 and the adjustable presser ring 66 when the rods 33 move downwardly. Continued motion compresses the springs 67 and a blank of material is sheared out of the strip by the blanking ring 63 working against the outer portion of the ring 51. The plunger then moves downwardly and draws the blank into cup-shape while its marginal edge portions are still gripped between the rings 51 and 66. As the pressure between these rings is yielding, part of the blank is drawn inwardly, to help form the side wall of the container. As the lower edge of the cutting collar 80 passes the upper inner edge of the ring 51, a scrap ring of material is cut off and the container has a smooth top edge on its side wall which will not warp out of shape when the container is expelled from the die by a blast of air through the orifice 77. The plunger and other parts of the die then move upwardly to the position shown in Fig. 15, and a fresh length of strip stock is advanced into position.

As shown in Figs. 1 and 2, a roll of work material 81 is journalled on a bracket 82 secured to the super-structure 25. Preferably, a friction device 83 with an adjusting screw 84 is provided on the trunnions of the roll to retard its unwinding. Rotation of the device 83 is limited by a stud provided on the bracket 82. As best shown in Figs. 1 and 15, the strip of material is gripped between a top driven roll 85 and an idler roll 86 of the feeding mechanism C. The strip extends through the die into the grip of another roll 87 and an idler roll 88. The roll 87 is slightly larger in diameter than the roll 85 but makes the same number of revolutions, due to the driving connections of the sprockets 85a and 87a and the sprocket chain F³. This produces a slight tension in the strip between the pairs of feed rolls and avoids slack or wrinkling of the strip. As will be explained, feed is intermittent, so that the rolls only operate when the die is in the open position, as shown in Fig. 15.

As best shown in Figs. 2, 3, 4, 13 and 14, the sprocket chain F' drives a small shaft 89 which has a beveled gear driving another beveled gear on a cross-shaft 90. The latter shaft has a sprocket wheel which drives the cam shaft 91 by means of the sprocket chain F². A sliding rack 92 is mounted in a housing 93 fixed to the main frame of the machine and makes toothed engagement with a gear 94 secured to a cross-shaft 95 which also carries a larger gear 96. A pair of tension springs 97 are secured to the housing 93 and also are connected to a cross head 98 on an adjusting screw 99 which limits the travel of the rack towards the cam shaft 91. The rack is provided at one end with a roller 92a adapted to be engaged by a cam 100 provided on the shaft 91. When the cam 100 moves the rack against the tension of the springs 97, the gears 94 and 96 will be rotated and cause rotation of the gear 101 which is journalled on the shaft of the upper feed roller 85 and is secured to the inner member 102 of a unidirectional clutch, whose outer housing 103 is secured to the shaft of the feed roll 85. This movement will cause the rolls 85 and 86 to feed a fresh length of work material into the die. When the rack is permitted to return under the influence of the springs 97, the member 102 will reverse its direction, but will turn freely in the housing 103, so that the feed wheels will not turn.

Preferably, the thermoplastic material is warmed slightly before being advanced into the die, and this may be accomplished by upper and lower heating coils 104 on opposite sides of the strip between the first set of feed rolls and the die. The coils receive their current through suitable wiring 105 which leads to a source of electric power through a conduit 106. Another power line 107 furnishes power to the heating coils on the die, and a line 108 extends through a switch 109 to the motor 31.

Figures 7, 8, 9:
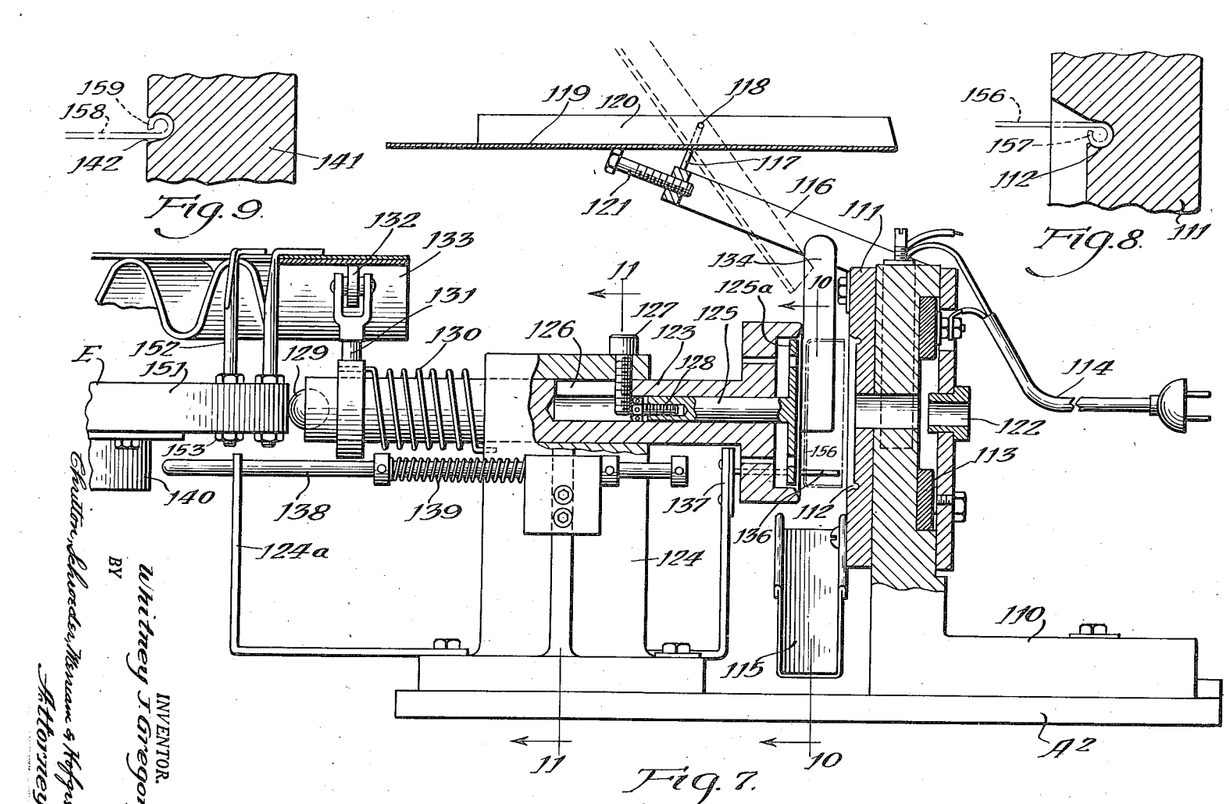
Fig. 7, a fragmentary view partly in section of one of the beading units, taken as indicated generally at line 7—7 of Fig. 5.
Fig. 8, an enlarged fragmentary sectional view of a portion of one of the bead forming dies for forming an inwardly directed bead.
Fig. 9, an enlarged fragmentary sectional view of a modified die to form an outwardly extending bead.

Six identical beading units are arranged in a circle on the platform A² of the main frame. As best shown in Fig. 7, each beading unit has an L-shaped bracket 110 which is bolted to the platform A² and has bolted to its front face a die 111 provided with a bead-forming groove 112. The die is heated by a heating coil 113 in the bracket 110 and receives its power through wires 114. A U-shaped discharge chute 115 is provided to catch the completed cup-shaped containers when withdrawn from the die 111. A U-shaped bracket 116 is bolted to the bracket 110 and extends upwardly and inwardly from the die. A pair of upwardly extending wires 117 are secured to the bracket 116 and provide inwardly extending trunnions 118 which make a pivotal connection with a tilting tray 119 having side walls 120. The tray is balanced so that it normally rests in a horizontal position on a bolt 121 extending into the bracket 116, as shown in Fig. 7. The tray is adapted to receive one cup-shaped container at a time in an upright position. When the tray is tilted up into the position indicated by dotted lines in Fig. 7, the container will slide down into bead-forming position. If desired, an opening 122 may be provided through the die and bracket for connection to an air line (not shown), to facilitate the removal of a container by a blast of air.

Figure 11:
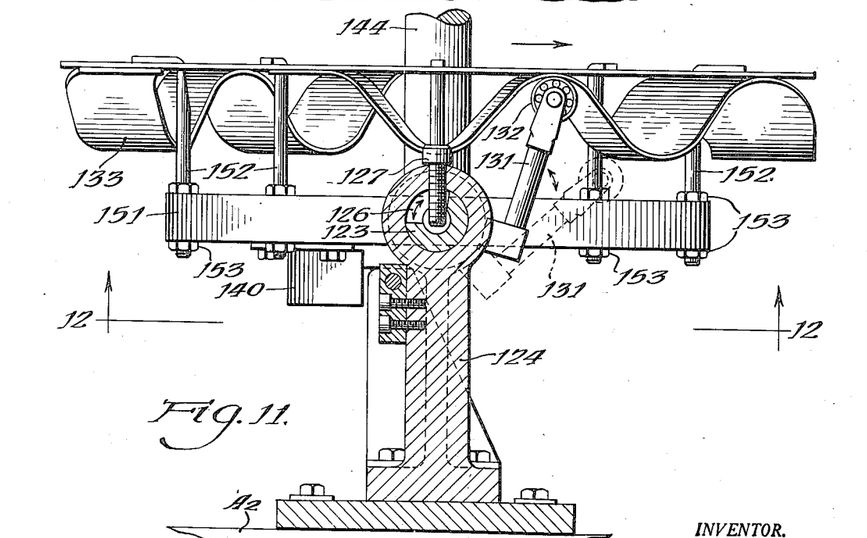
Fig. 11, a fragmentary vertical sectional view, taken as indicated at line 11—11 of Fig. 7.

Directly opposite the die 111 is a ram 123, which is slidably mounted in a bracket 124 bolted to the platform A². The ram head is hollow, so that it may embrace the bottom portion of a container and thrust the end of the container into the beading groove. A tappet member 125 is slidably mounted in the shank of the ram and has a head 125a which is adapted to force the container out of the embrace of the ram head, when the ram is drawn rearwardly. As best shown in Figs. 7 and 11, the shank of the ram 125 has a cut-away quadrant 126, so that a bolt 127 may extend into the shank of the ram, limit the oscillation of the ram, limit its reciprocation, and also limit the rearward travel of the tappet by engagement with an adjustable bolt 128 provided in the rear end of the shank of the tappet.

The ram is provided near its rear end with a ball-shaped bearing 129 which is urged against a cam on the turret E by means of a combined compression and torsion spring 130. The ram is provided with a crank-like arm 131 having a roller 132 to engage a cam 133 provided on the turret E. The cam 133 is rotated continuously and causes the ram head and container to oscillate while the bead is being formed. This action is found to produce a better bead than can be obtained by a stationary device. It will be understood that the spring 130 urges the arm 131 upwardly into engagement with the cam 133.

Figure 10:
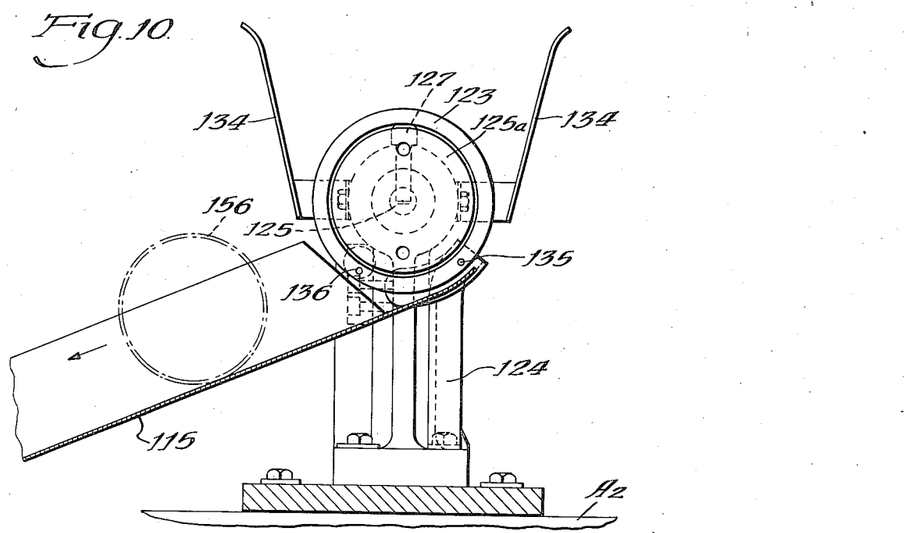
Fig. 10, a vertical sectional view, taken as indicated at line 10—10 of Fig. 7.

As shown in Fig. 10, a pair of wing-like guides 134 are bolted to the bracket 124 and serve to guide the container into beading position as it is discharged from the tilting tray 119. The ram head carries a pair of freely slidable positioning pins 135 and 136 which serve to support the container in proper position as the ram advances towards the die 110. When the pins contact the die 111, they merely slide back with relation to the advancing ram head, but when the movement is reversed, one of the pins engages a stop 137 secured to the bracket 124 and again engages the side wall of the finished container. However, the other pin, having moved out of supporting position, will permit the container to roll down into the chute 115 and be discharged from the machine. In order to reset the pin 136, a push rod 138 is provided and is slidably mounted in the bracket 124 and an extension to said bracket 124a. A compression spring 139 urges the push rod rearwardly, where it may be engaged by a cam 140 provided on the turret E. The cam 140 is so positioned that it will cause the push rod to move the pin 136 back into extended position before the next container is dropped onto the pins from the tray 119.

The die 111, shown in Figs. 7 and 8, is designed to form an inwardly directed bead. However, it will be understood that an outwardly extending bead may be formed by the same machinery, by substituting a modified die 141 having a groove 142 of the type illustrated in Fig. 9.

Figure 6:
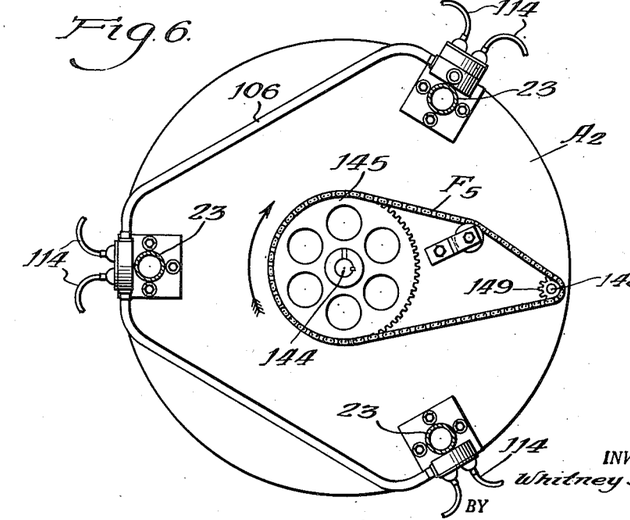
Fig. 6, a bottom plan view, taken as indicated at line 6—6 of Fig. 1.
Figure 12:
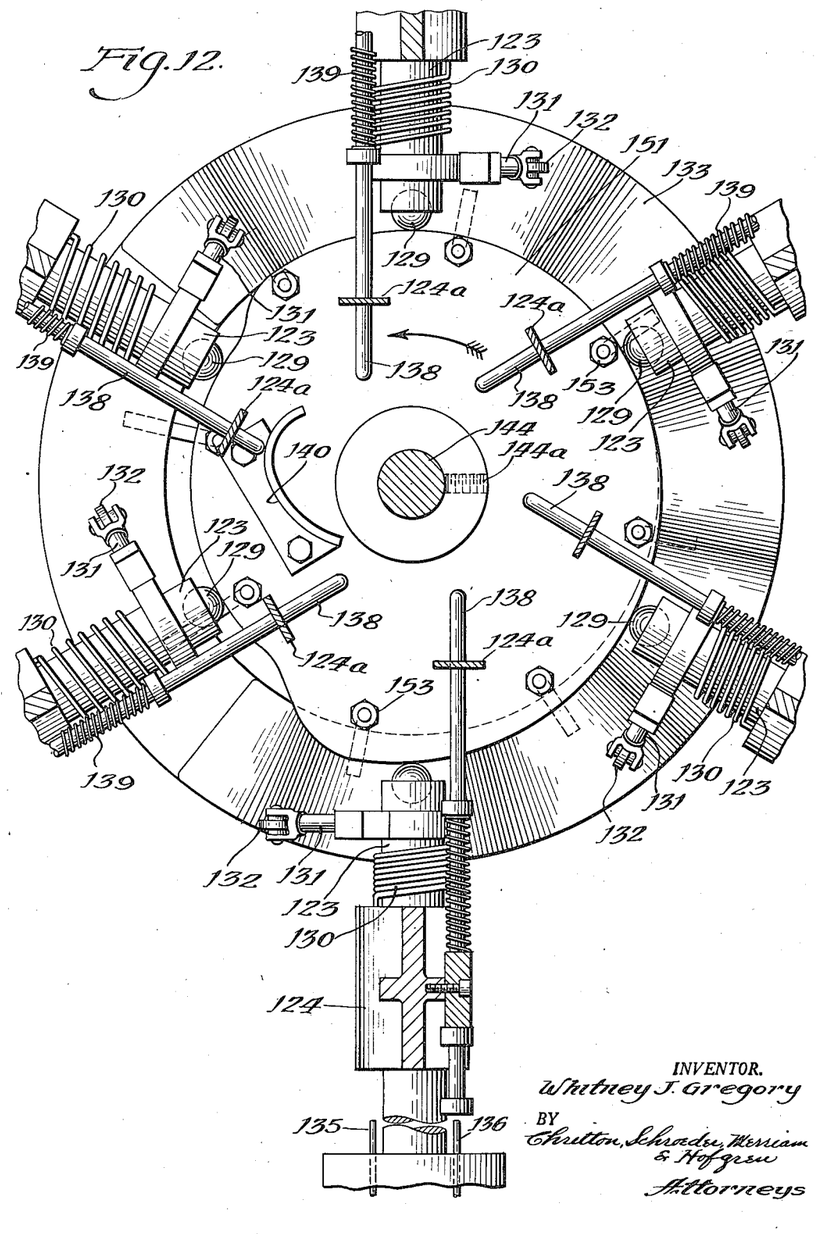
Fig. 12, a bottom plan sectional view from below, taken as indicated at line 12—12 of Fig. 11.
Figures 13, 14:
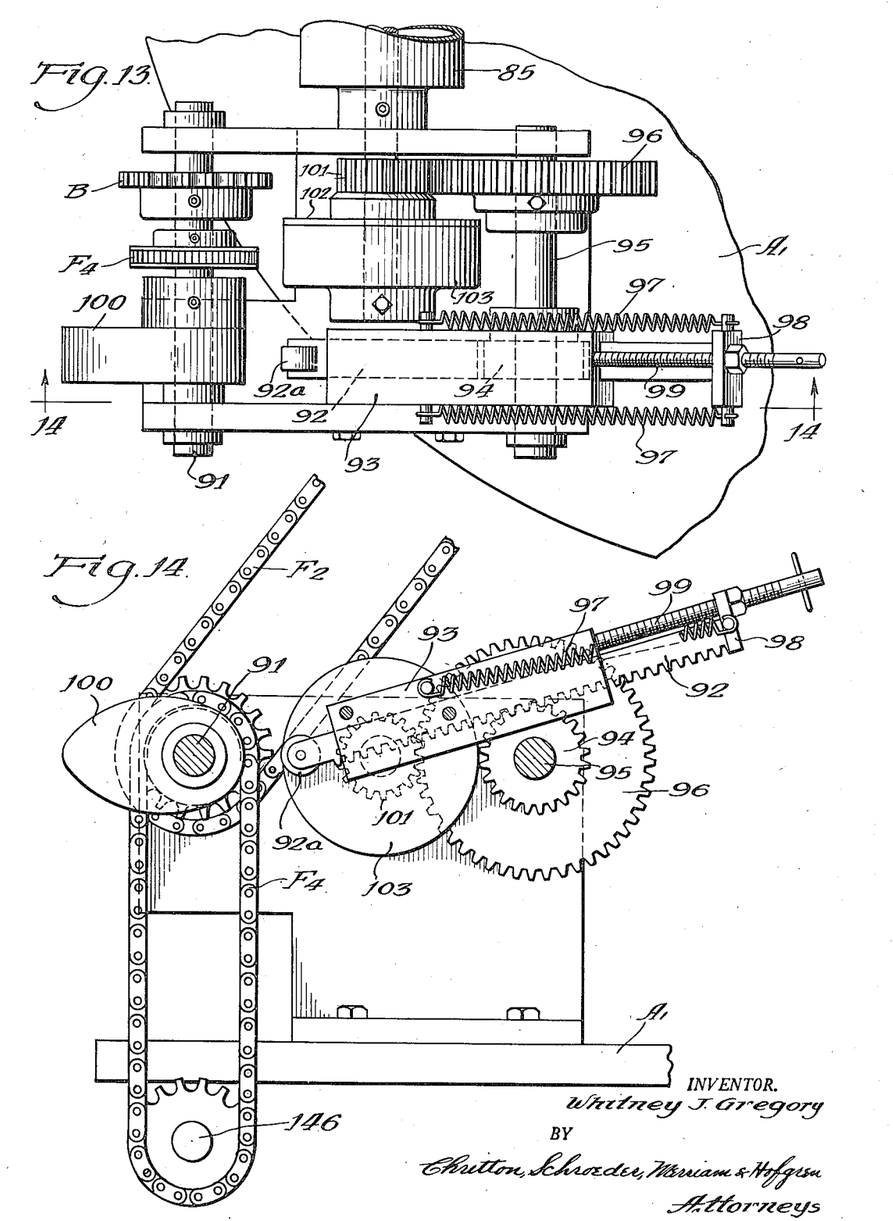
Fig. 13, a fragmentary plan view of part of the transmission for imparting intermittent motion to the feed rolls for a strip of work material.
Fig. 14, a fragmentary vertical sectional view, taken as indicated at line 14—14 of Fig. 13.

The turret E is journalled in a thrust bearing 143 on the platform A², as shown in Figs. 1 and 2. A centrally disposed shaft 144 extends downwardly and is provided beneath the platform A² with a sprocket wheel 145. The turret is continuously rotated, and is driven from the cam shaft 91, shown in Figs. 2 and 14, by a sprocket chain F⁴ which drives a sprocket wheel on a shaft 146 which is provided with a beveled gear 147 which drives a beveled gear on a vertical shaft 148 and, as shown in Fig. 6, is provided at its lower end with a sprocket wheel 149, which drives the sprocket wheel 145 of the turret by means of the chain F⁵. The shaft 144 of the turret supports at its upper end an inclined chute 150, so that its upper end is always beneath the forming die and its lower end swings over each of the tilting trays 119 of the beading units. The movement of the parts is timed so that six containers are formed while each beading unit handles one container. The device is also timed so that the lower end of the chute 150 will be over one of the tilting trays 119 whenever a container is being discharged. As best shown in Figs. 11 and 12, the turret has a cam wheel 151 fixed to the central shaft 144 by a set screw 144a, and to this cam wheel is secured the undulating cam 133 by means of welded arms 152 provided with threaded shanks and nuts 153. It will be understood that the cam wheel 151 causes reciprocation of the ram 123, while the upper undulating cam 133 causes oscillation of the arms. The cam 140 is bolted to the under side of the large cam 151 and operates the push rods 138 to reset the positioning pins 136. In addition to these cams, there is fixed to the turret an upwardly extending loop-like cam 154, which engages the tilting trays 119 and causes the container, deposited thereon from the chute 150, to be dropped into the positioning fingers 136 and 137.

Figure 19:
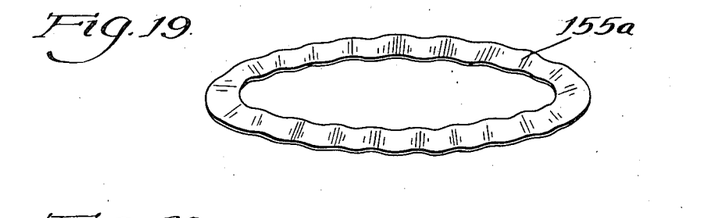
Fig. 19, a perspective view of a trim ring which is cut from the cup as the forming operation is completed.
Figure 20:
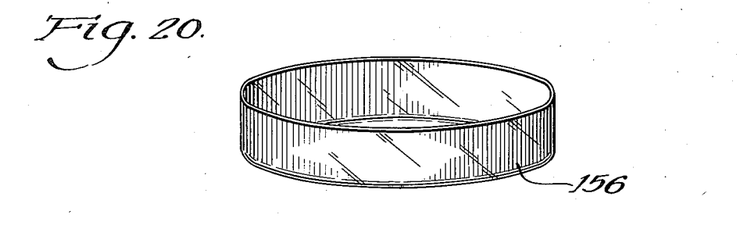
Fig. 20, a perspective view of a formed cup as it leaves the forming die and before it is beaded.
Figure 21:
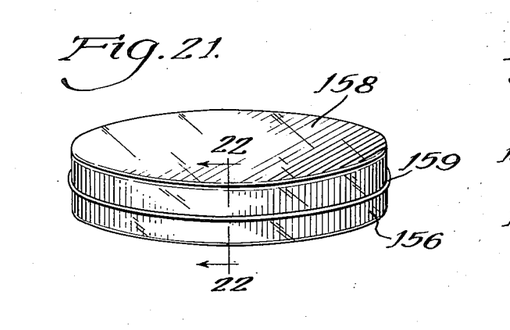
Fig. 21, a perspective view of a completed container having a pair of cups, either of which may be formed automatically by the improved machine.
Figure 22:
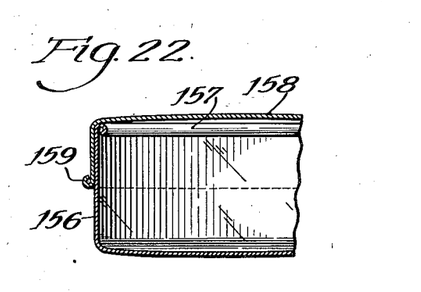
Fig. 22, a fragmentary sectional view, taken as indicated at line 22—22 of Fig. 21.

The various steps in the manufacture of a cup-shaped container are shown in Figs. 18–22. A circular blank 155 is cut from the strip 81 in the form shown in Fig. 18. A cup-shaped container 156 is formed from the blank, and a marginal ring 155a, shown in Fig. 19, is trimmed from its top portion. An inwardly directed bead 157 is formed in one of the beading units B. A cover 158 for such a container may be formed on the same machine by using slightly larger dies and substituting a die 141 of the type shown in Fig. 9, to form an outer bead 159.

*Operation*

All of the moving parts of the machine operate in timed relation, when the motor 31 is turned on by the switch 109. As described above, the work material is fed from a roll through the die by means of the feeding and tensioning rolls 85 and 87. Feed of the strip is stopped, the blanking die comes down and grips a circular area of the material and shears off its outer edge. While still gripping the blank, the forming plunger comes down, forms a cup, and the collar 80 trims off a waste ring 157. A blast of air through the orifice 76 blows the container down into the chute 150, and when the plunger moves upwardly a waste ring 151 is blown out of the machine by a blast of air from the air line 77. The feeding mechanism then moves a fresh length of strip into the die. The turret chute 150, while travelling around deposits one container in each of the tilting trays 119, and the cam 154 causes the tray to deposit the container in bead forming position. The ram presses the container into the bead forming groove and oscillates the container while the bead is being formed. When the ram withdraws, the tappet knocks the container out of the ram head and it drops down and rolls out of the chute 115.

The foregoing detailed description is given for clearness of understanding only, and no unnecessary limitations should be understood therefrom, for some modifications will be obvious to those skilled in the art.

I claim:

1. An automatic machine for making cup-shaped containers with beaded edges, comprising: a main frame provided at its upper portion with a blanking and forming die; a plurality of beading units arranged in a circle on said frame beneath and around said forming die; conveyor means for directing different cup-shaped containers from the forming die directly to each of said beading units seriatim; and means for driving said blanking and forming die, said conveyor means, and the beading units in timed relation.

2. A machine as specified in claim 1, in which the blanking and forming die includes a reciprocating plunger provided at its lower end with a forming head having rounded corners adapted to draw a flat work material blank into cup-shape in a female die, and said plunger having on its neck a cutting collar adapted to shear a trim ring from the upper portion of the work material as the plunger head advances into the female die.

3. A machine as specified in claim 1, in which the blanking and forming die includes a reciprocating blanking ring having an undulated cutting edge to cut a forming blank from a strip of work material, a spring urged presser ring for yieldingly gripping said forming blank, and a reciprocating ram in said presser ring for drawing the blank into cup-shape by forcing it into a female die while the marginal portion of said blank is gripped by the presser ring.

4. A machine as specified in claim 1, in which each beading unit has a tiltable tray adapted to receive a single cup-shaped container from the conveyor means, and the conveyor means has a rotating cam for tilting said tray and sliding the container into beading position.

5. A machine as specified in claim 1, in which each beading unit has a heated beading groove, and a ram for pressing the edge of a cup-shaped container into said groove.

6. A machine as specified in claim 1, in which each beading unit has a heated beading groove, a ram for gripping the cup-shaped container and pressing its edge portion into said groove, and means for oscillating said ram while the bead is being formed in the groove.

7. A machine as specified in claim 1, in which the conveyor means includes a centrally disposed continuously rotating turret, said turret having at its upper portion a receiving chute having one end disposed beneath the forming die and the other end arranged to swing over the beading units, each of said beading units having a heated beading groove and a reciprocating ram for pressing the edge portion of a cup-shaped container into said groove, and cam means on said turret for oscillating said plungers.

8. A machine as specified in claim 1, in which the conveyor means includes a centrally disposed continuously rotating turret, said turret having at its upper portion a receiving chute having one end disposed beneath the forming die and the other end arranged to swing over the beading units, each of said beading units having a heated beading groove and a reciprocating ram for pressing the edge portion of a cup-shaped container into said groove, a tiltable tray on each of the beading units adapted to receive a single container from said turret chute, and a cam on said turret for progressively tilting the loaded trays and discharging said containers into beading position in the unit.

9. A machine as specified in claim 1, in which each beading unit has a heated beading groove, an inclined discharge chute beneath said groove, a reciprocable hollow ram head opposite the groove to embrace the closed end of a cup-shaped container and press it into beading contact with said groove, a tappet slidably mounted in said ram to knock out said container when the ram is retracted, and rotating cam means driven by the conveyor means for reciprocating said ram periodically and oscillating it continually.

10. A machine as specified in claim 1, in which each beading unit has a heated beading groove, an inclined discharge chute beneath said groove, a reciprocable hollow ram head opposite the groove to embrace the closed end of a cup-shaped container and press it into beading contact with said groove, a pair of positioning pins slidably mounted in said ram head so as to hold the container in proper position while it is advanced into beading contact with the groove, means limiting the rearward travel of one of said pins when the ram head is retracted, a push rod for returning the other positioning pin into receiving position after a completed container has been permitted to drop into the discharge chute, and cam means driven by the conveyor means for periodically actuating said push rod.

WHITNEY J. GREGORY.

REFERENCES CITED

The following references are of record in the file of this patent:

UNITED STATES PATENTS

| Number | Name | Date |
|---|---|---|
| 891,642 | Tietzmann | June 23, 1908 |
| 1,035,984 | Malde | Aug. 20, 1912 |
| 1,553,504 | Buchanan | Sept. 15, 1925 |
| 1,553,505 | Buchanan | Sept. 15, 1925 |
| 1,844,500 | Dailey | Feb. 9, 1932 |